(12) United States Patent
Manda

(10) Patent No.: US 7,232,305 B2
(45) Date of Patent: Jun. 19, 2007

(54) LOAD MANAGEMENT DEVICE FOR A FEED BODY OF A MOLDING MACHINE

(75) Inventor: Jan Marius Manda, Toronto (CA)

(73) Assignee: Husky Injection Molding Systems, Ltd., Bolton, Ontario (CA)

( * ) Notice: Subject to any disclaimer, the term of this patent is extended or adjusted under 35 U.S.C. 154(b) by 278 days.

(21) Appl. No.: 11/134,585

(22) Filed: May 20, 2005

(65) Prior Publication Data

US 2006/0263462 A1   Nov. 23, 2006

(51) Int. Cl.
B29C 45/74   (2006.01)

(52) U.S. Cl. .................. 425/547; 425/548; 425/549

(58) Field of Classification Search ............... 425/547, 425/548, 549
See application file for complete search history.

(56) References Cited

U.S. PATENT DOCUMENTS

| | | | |
|---|---|---|---|
| 5,051,086 A * | 9/1991 | Gellert ........................ | 425/549 |
| 5,178,886 A | 1/1993 | Donovan et al. | |
| 5,213,824 A | 5/1993 | Hepler | |
| 5,234,336 A * | 8/1993 | Hosokawa et al. ......... | 425/549 |
| 6,095,789 A | 8/2000 | Hepler et al. | |
| 6,357,511 B1 | 3/2002 | Kestle et al. | |
| 6,520,764 B1 * | 2/2003 | Ito et al. ..................... | 425/547 |
| 6,533,571 B2 * | 3/2003 | Fikani ......................... | 425/549 |
| 6,992,269 B2 * | 1/2006 | Renwick et al. ............ | 425/549 |
| 7,118,703 B2 * | 10/2006 | Trudeau ...................... | 425/547 |
| 2003/0086997 A1 * | 5/2003 | Olaru .......................... | 425/549 |
| 2005/0048161 A1 * | 3/2005 | Trakas ........................ | 425/549 |
| 2006/0228438 A1 * | 10/2006 | Koike et al. ................ | 425/472 |

FOREIGN PATENT DOCUMENTS

| | | |
|---|---|---|
| WO | 2004078383 | 9/2004 |
| WO | WO 2004/078383 A1 | 9/2004 |

OTHER PUBLICATIONS

Internaltional Search Report for PCT/CA2006/000649, dated Aug. 3, 2006, four pages, related to the above-identified US patent application.

* cited by examiner

*Primary Examiner*—Tim Heitbrink

(57) ABSTRACT

Disclosed herein is a load management device configured for a feed body of any one of a molding machine, a hot runner assembly and any combination thereof. The load management device includes a load-transferring body configured to present a load-receiving surface and a load-imparting surface. The load-transferring body is configured to connect the load-receiving surface with the load-imparting surface, to transfer a substantial amount of load-received by the load-receiving surface over to the load-imparting surface, and to transfer an in-substantial amount of load-received by the load-receiving surface over to the feed body.

27 Claims, 2 Drawing Sheets

LOAD MANAGEMENT DEVICE FOR A FEED BODY OF A MOLDING MACHINE

FIELD OF THE INVENTION

The present invention generally relates to molding machines, and more specifically, the present invention relates to a load management device configured for a feed body of a molding machine.

BACKGROUND

A type of metallic material exists in one of three possible states: a liquefied state, a solidified state and a slurry state. Generally, the type of metallic material is a metallic alloy that contains two or more metallic elements and/or non-metallic elements that are fused together and/or dissolved into each other. Examples of this type of metallic material are magnesium, aluminum, and zinc, and any combination thereof, or equivalent thereof. The metallic alloy in the slurry state will henceforth be referred to as metallic alloy slurry (MAS). Sometimes, the MAS is called a "thixotropic metallic material", and the molding machine that processes the MAS is called a "thixo-molding" machine.

U.S. Pat. No. 6,357,511 (Assignee: Husky Injection Molding Systems Ltd.; issued Mar. 19, 2002) discloses a metal alloy injection molding machine (e.g. for magnesium alloy) that has an injection nozzle including a spigot portion whose outer periphery is fitted in channel surface to form seal between surface and periphery of spigot. The '511 teaches abutting a nozzle 11 directly against a feed body 13".

Published patent application WO 2004/078383 A1 (Assignee: Husky Injection Molding Systems Ltd.) discloses a feed body configured for use in a thixo-molding machine. The '383 teaches abutting a nozzle 50 or a nozzle extension 48 directly against a feed body 52.

U.S. Pat. No. 6,095,789 (Assignee: Polyshot Corporation) discloses a hot sprue bushing for transporting plasticized material from an injection nozzle to a mold cavity comprises an electric heater wrapped around a stem of the bushing. The '789 teaches abutting a nozzle 14 directly against a feed body 24a.

U.S. Pat. No. 5,213,824 (Assignee: Polyshot Corporation) discloses an adjustable hot sprue bushing for injections molds provided with interchangeable spacing collars. The '824 teaches abutting a nozzle 14 directly against a feed body structure 70.

U.S. Pat. 5,178,886 (Assignee: United Technologies Corporation; issued Jan. 12, 1993) discloses a easily removable injection mold port that includes inwardly widening passage with at least one longitudinal groove to assist removal of hardened plastic by rotating port. The '886 teaches abutting a nozzle 10 directly against a feed body structure 13.

It appears that prior art structures and arrangements pertaining to known feed bodies used in molding machines have persisted for a least 10 years (from Jan. 12, 1993 over to Mar. 19, 2002 as indicated in the prior art identified above) and yet there are ongoing problems with these feed bodies. These feed bodies appear to be prone to rapid onset of stress crack development. It is generally believed that these stress cracks develop as a result of the feed body being exposed to hoop stress due to a high pressure of the MAS, and/or to thermal stress due to a high temperature of the MAS. Disadvantageously, the onset of stress cracks imposes frequent maintenance and/or replacement of the feed body, and/or inadvertent shut down of the thixo-molding machine during production run-time.

SUMMARY

According to an aspect of the present invention, there is provided a load management device configured for a feed body of any one of a molding machine, a hot runner assembly and any combination thereof, the load management device including a load-transferring body configured to present a load-receiving surface, and a load-imparting surface, wherein the load-transferring body is configured to connect the load-receiving surface with the load-imparting surface, to transfer a substantial amount of load-received by the load-receiving surface over to the load-imparting surface, and to transfer an in-substantial amount of load-received by the load-receiving surface over to the feed body.

According to an aspect of the present invention, there is provided a hot runner assembly, including a feed body, and a load management device configured for the feed body, the load management device including a load-transferring body configured to present a load-receiving surface, and a load-imparting surface, wherein the load-transferring body is configured to connect the load-receiving surface with the load-imparting surface, to transfer a substantial amount of load-received by the load-receiving surface over to the load-imparting surface, and to transfer an in-substantial amount of load-received by the load-receiving surface over to the feed body.

According to an aspect of the present invention, there is provided a molding machine, including a feed body, and a load management device configured for the feed body, the load management device including a load-transferring body configured to present a load-receiving surface, and a load-imparting surface, wherein the load-transferring body is configured to connect the load-receiving surface with the load-imparting surface, to transfer a substantial amount of load-received by the load-receiving surface over to the load-imparting surface, and to transfer an in-substantial amount of load-received by the load-receiving surface over to the feed body.

A technical effect of the above mentioned aspects of the present invention permit the reduction of rapid onset of stress cracks in the feed body so that relatively infrequent maintenance and/or replacement of the feed body is needed, and/or avoidance of inadvertent shut down of a thixo-molding machine during critical production may be realized.

BRIEF DESCRIPTION OF THE DRAWINGS

Exemplary embodiments of the present invention will be described with reference to the following Figures and the detailed description, in which.

DETAILED DESCRIPTION OF THE EMBODIMENTS

The inventor does not believe that rapid onset of stress cracks that occurs in a feed body is a result of exposing the feed body to a mere combination of hoop stress and thermal stress as originally believed by the industry that has been grappling with this problem for at least 10 years. The inventor believes that the rapid onset of stress cracks is a result of exposing the feed body to a three prong combination of hoop stress, thermal stress and mechanical loading forces (hereinafter referred to as the "load"). By abutting a nozzle directly against a feed body, the load will be transferred from the nozzle and directly into the feed body. Once the feed body receives the load, the onset of stress cracks develop at an accelerated rate. The inventor believes that the solution to the problem is to significantly prevent the load from reaching the feed body by shunting the load away from the feed body and over to and/or into other adjacent structures (such as a mold for example). By shunting the load away from the feed body, it is believed that the onset of stress crack development in the feed body will be decelerated or retarded. Managing the load of the feed body does not entirely eliminate the onset of stress cracks, but will retard the onset of stress cracks over time.

Figure 1:
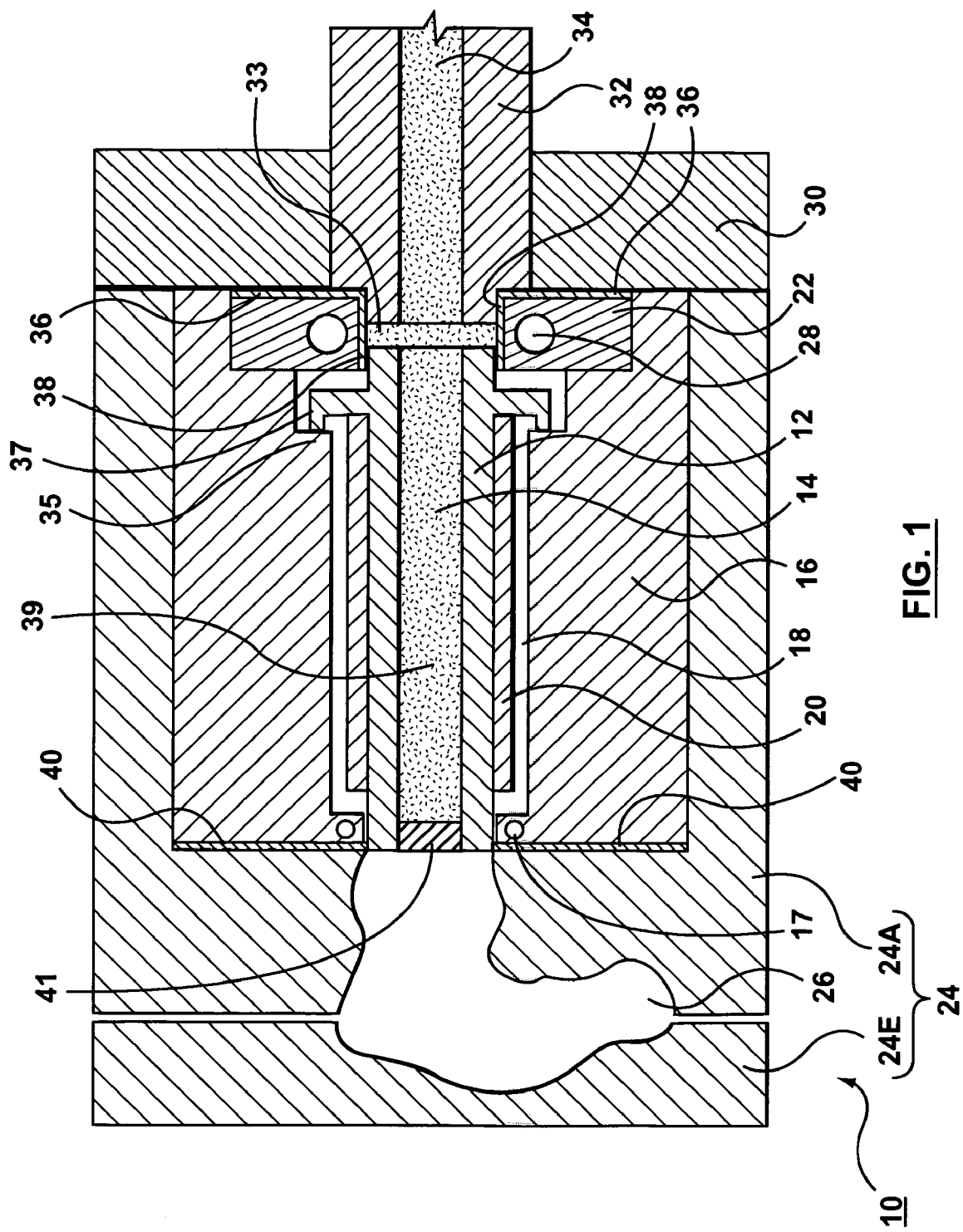
FIG. 1 is a cut away view along a longitudinal axis of a load management device according to a first embodiment (which is the preferred embodiment)

FIG. 1 is the cut away view along the longitudinal axis of the load management device (LMD) 10 according to the first embodiment (which is the preferred embodiment). The LMD 10 is configured for a feed body 12 of a thixo-molding machine (not depicted). Another name for the feed body 12 is a "sprue". The LMD 10 is also usable in molding machines configured to handle plastic melt (that is, non-metallic material melt).

A feed body 12 defines a feed body passageway 14 therein that extends from a exit end to a entrance end of the feed body 12. The exit end faces a mold cavity 26 defined by a mold 24. The mold 24 includes a stationary mold half 24A and a moving mold half 24E. The stationary mold half 24A is attached to a stationary platen 30, and the moving mold half 24E is attached a moving platen (not depicted).

The entrance end faces a nozzle 32 that extends from a barrel (not depicted) of the thixo-molding machine. The nozzle 32 defines a nozzle passageway 34 therein. The body 12 conveys the MAS 39 from the nozzle passageway 34 through the feed body passageway 14 and into the mold cavity 26. A plug 41 is formed in the exit end of the feed body 12 by a cooling mechanism 17 disposed near the exit end of the feed body 12. The cooling mechanism may be, for example, a heat sink or a cooling passageway that carries a coolant therein. The cooling mechanism 17 is placed within a mold insert 16. When the coolant is permitted to run cold, the plug 41 is formed. The plug 41 becomes blown out from its depicted location when the pressure of the MAS is built up to a sufficient level (that is, the plug blow-out pressure). Once the mold cavity 26 is filled, the coolant within the mechanism 17 will then form a new plug from the MAS located near the exit end of the feed body 12.

The mold insert 16 defines a cavity 18 therein that is sized to receive the feed body 12. The cavity 18 is sized to receive a retainer 22 therein. A portion of the mold 24 defines an insert-receiving cavity therein sized to receive the mold insert 16 therein. The combination of the mold insert 16 and the retainer 22 keeps or retains the feed body 12 securely mounted within the cavity 18 of the feed body 12. For added retention support, the feed body 12 also includes an arm 37 that extends from the feed body 12 over to a shoulder 35 of the mold insert 16. Coupled to the feed body 12 is a heater 20 that keeps the MAS disposed in the feed body passageway 14 in the slurry state. The stationary platen 30 defines a channel that receives the nozzle 32.

Alternatively, the channel defined in the platen 30 is attached to a thixo hot runner assembly (not depicted) that includes a feed structure that feeds the MAS to a hot runner feed body (similar to the feed body 12) that is included in or with the hot runner assembly. The thixo hot runner assembly is a MAS distribution structure that is configured to distribute the MAS to an interconnected network of hot runner feed bodies that channel the MAS to other entrances that lead into the mold cavity 26 or to other mold cavities (not depicted) used for molding other individual articles.

To assemble the arrangement depicted in FIG. 1, the mold insert 16 is initially slipped into the insert cavity defined by the mold 24. Then the feed body 12 is inserted into the cavity 18 of the mold insert 16. Finally, the retainer 22 is inserted into the cavity 18 of the mold insert 16 and then fits over the feed body 12.

The LMD 10 reduces an amount of load transmitted over to the feed body 12 from surrounding structures such as the nozzle 32. The technical effect of this arrangement is to reduce or delay the onset of stress crack development. The LMD 10 mitigates the onset of stress crack development as a result of the combined exposure of the feed body 12 to the load, hoop pressure stress and temperature stress. The LMD 10 does not have a direct effect on the hoop pressure stress and the temperature stress per se.

The LMD 10 includes a load-receiving surface 36, a load-receiving surface 38, a load-imparting surface 40, and a load-transferring body. In this embodiment, the load-transferring body is the combination of the feed body retainer 22 and the mold insert 16 placed adjacent to the feed body retainer 22. The load-transferring body (that is, items 22 and 16) connects the load-receiving surfaces 36, 38 to the load-imparting surface 40. In this embodiment, the load-receiving surfaces 36, 38 are part of the retainer 22.

In alternative embodiments, the load transferring-body is a structure or a combination of structural elements that attaches, or abuts, to a load-receiving surface and a load-imparting surface.

In operation, the load transferring body (the combination of items 16 and 22) transfers a substantial amount of load received by the load-receiving surface (the combination of items 36, 38) over to the load-imparting surface 40. The surface 40 abuts the mold 24 (which is an example of adjacently located structure). Also, the load transferring body (the combination of items 16, 22) transfers an insubstantial amount of load received by the load-receiving surface (items 36, 38) over to the feed body 12.

The load may originate from the stationary platen 30 that is a structure adjacent to the surfaces 36, 38 and/or from the nozzle 32.

A technical effect of this arrangement permits substantial shunting of the load away from the feed body 12, which reduces the onset of stress crack development in the feed body 12. The arrangements of the load-receiving, load-imparting surfaces and the load-transferring body, in effect, decouple the feed body 12 from the source of the load, so that an insubstantial amount of the load is transferred from the source of the load over to the feed body 12.

The load originating from the nozzle 32 has an axially-aligned load component (that is, aligned axially along the nozzle 32) and has a radially-aligned load component (that is, aligned radially from the axis of the nozzle 32). The axially-aligned load component is received by the load-receiving surface 36 and the radially-aligned load component is received by the load-receiving surface 38. The load-transferring body shunts the axially- and radially-aligned load components past the feed body 12 and through items 16, 22 and then over to the load-imparting surface 40 which then imparts these load components over to the mold 24.

In alternative embodiments, the surfaces 36, 38 are aligned non-vertically and non-horizontally with respect to orientation of the horizontal and vertical references surfaces of the stationary platen 30.

Preferably, the feed body 12 and the retainer 22 abut each other in a way that minimizes transfer of loads into the feed body 12, and/or the retainer 22 is axially offset from the feed body 12. Preferably, the retainer 22 maintains the feed body 12 offset from the nozzle 32. Alternatively, the feed body 12 may abut the nozzle 32 provided that the load components are not significantly transferred over into the feed body 12 from the nozzle 32.

The LMD 10 optionally includes a cooling device 28 within the retainer 22 (that is a portion of the load-transferring body). The cooling device 28 is configured to cool structural gaps proximally located to the location where the feed body 12 meets with the nozzle 32 and the retainer 22. A technical effect of the cooling device 28 is that by freezing the MAS in these gaps, leakage of MAS from these gaps is prevented and/or substantially reduced.

Alternatively, this cooling effect is provided by configuring the mold insert 16 to pass the coolant near enough to the identified gaps that would then draw heat away from these gaps.

Figure 2:
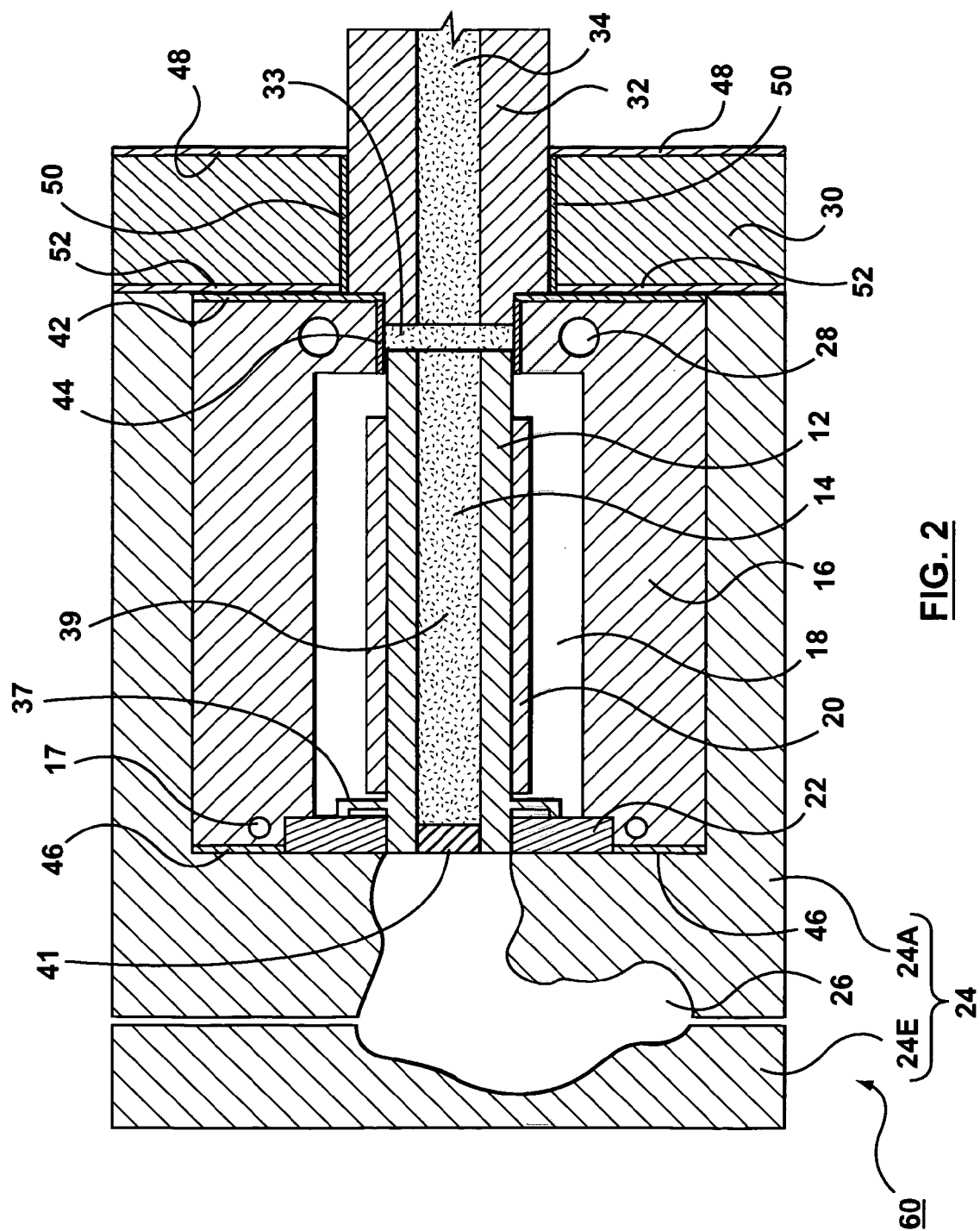
FIG. 2 is a cut away view along a longitudinal axis of another load management device according to a second embodiment.

FIG. 2 is a cut away view along the longitudinal axis of another load management device 60 according to the second embodiment. In sharp contrast to the arrangement depicted in FIG. 1, the retainer 22 is located between the mold 24 and the mold insert 16.

To assemble the arrangement depicted in FIG. 2, the mold insert 16 is not yet installed into an orifice of the mold 24. The feed body 12 is inserted into the mold insert 16 and then the retainer 22 is placed over the feed body 12. Then, the mold insert 16 is installed into the cavity defined by the mold 24. The cooling device 28 is positioned adjacent to the entrance of the feed body passageway 14. The nozzle 32 abuts the mold insert 16. The mold insert 16 presents a load receiving-surface 42, a load receiving-surface 44 and a load-imparting surface 46. In this embodiment, the mold insert 16 is the load-transferring body that connects the load-receiving surfaces 42, 44 with the load-imparting surface 46. In the second embodiment, the retainer 22 does not present a load-imparting surface which abuts the mold 24.

Alternatively, the nozzle 32 abuts the stationary platen 30, and the feed body 12 is extended to either abut the nozzle 32 or remain offset from the nozzle 32. The platen 30 is the load-transferring body that includes load-receiving surfaces 48, 50 and a load-imparting surface 52, and the combination of the retainer 22 and the mold insert 16 present the load-imparting surface 46.

It will be appreciated that some elements may be adapted for specific conditions or functions. The concepts described above may be further extended to a variety of other applications that are clearly within the scope of the present invention. Having thus described the embodiments, it will be apparent to those skilled in the art that modifications and enhancements are possible without departing from the concepts as described. Therefore, what is intended to be protected by way of letters patent should be limited only by the scope of the following claims:

The invention claimed is:

1. A load management device configured for a feed body of any one of a molding machine, a hot runner assembly and any combination thereof, the load management device comprising:
 a load-transferring body configured to present:
  a load-receiving surface, and
  a load-imparting surface;
 wherein the load-transferring body is configured to connect the load-receiving surface with the load-imparting surface, to transfer a substantial amount of load-received by the load-receiving surface over to the load-imparting surface, and to transfer an in-substantial amount of load-received by the load-receiving surface over to the feed body.

2. The load management device of claim 1 wherein:
 the load-transferring body is configured to substantially decoupled from the feed body.

3. The load management device of claim 1, wherein:
 the load-transferring body is configured to be placed axially offset from the feed body.

4. The load management device of claim 1, wherein:
 the load-transferring body is configured to place the feed body offset from a nozzle.

5. The load management device of claim 1, wherein:
 the load-receiving surface is configured to receive an amount of load from a nozzle.

6. The load management device of claim 1, wherein:
 the load-imparting surface is configured to substantially impart a received amount offload from a nozzle over to a mold.

7. The load management device of claim 1, wherein:
 the load-receiving surface is configured to abut a nozzle; and
 the load-imparting surface is configured to abut a mold.

8. The load management device of claim 1, further comprising:
 a cooling device is configured to be located within the load-transferring body, the cooling device is configured to cool structural gaps located in gaps between the feed body and structural components surrounding the feed body.

9. The load management device of claim 1, wherein:
 the feed body is a metallic alloy slurry (MAS) feed body;
 the molding machine is a thixo-molding machine; and
 the hot runner assembly is a thixo hot runner assembly.

10. A hot runner assembly, comprising:
 a feed body; and
 a load management device configured for the feed body, the load management device including:
  a load-transferring body configured to present:
   a load-receiving surface, and
   a load-imparting surface;
  wherein the load-transferring body is configured to connect the load-receiving surface with the load-imparting surface, to transfer a substantial amount of load-received by the load-receiving surface over to the load-imparting surface, and to transfer an in-substantial amount of load-received by the load-receiving surface over to the feed body.

11. The hot runner assembly of claim 10, wherein:
 the load-transferring body is configured to substantially decoupled from the feed body.

12. The hot runner assembly of claim 10, wherein:
 the load-transferring body is configured to be placed axially offset from the feed body.

13. The hot runner assembly of claim 10, wherein:
 the load-transferring body is configured to place the feed body offset from a nozzle.

14. The hot runner assembly of claim 10, wherein:
 the load-receiving surface is configured to receive an amount of load from a nozzle.

15. The hot runner assembly of claim 10, wherein:
 the load-imparting surface is configured to substantially impart a received amount offload from a nozzle over to a mold.

16. The hot runner assembly of claim 10, wherein:
the load-receiving surface is configured to abut a nozzle; and
the load-imparting surface is configured to abut a mold.

17. The hot runner assembly of claim 10, further comprising:
a cooling device is configured to be located within the load-transferring body, the cooling device is configured to cool structural gaps located in gaps between the feed body and structural components surrounding the feed body.

18. The hot runner assembly of claim 10, wherein:
the feed body is a metallic alloy slurry (MAS) feed body; and
the hot runner assembly is a thixo hot runner assembly.

19. A molding machine, comprising:
a feed body; and
a load management device configured for the feed body, the load management device including:
a load-transferring body configured to present:
a load-receiving surface, and
a load-imparting surface;
wherein the load-transferring body is configured to connect the load-receiving surface with the load-imparting surface, to transfer a substantial amount of load-received by the load-receiving surface over to the load-imparting surface, and to transfer an insubstantial amount of load-received by the load-receiving surface over to the feed body.

20. The molding machine of claim 19, wherein:
the load-transferring body is configured to substantially decoupled from the feed body.

21. The molding machine of claim 19, wherein:
the load-transferring body is configured to be placed axially offset from the feed body.

22. The molding machine device of claim 19, wherein:
the load-transferring body is configured to place the feed body offset from a nozzle.

23. The molding machine of claim 19, wherein:
the load-receiving surface is configured to receive an amount of load from a nozzle.

24. The molding machine of claim 19, wherein:
the load-imparting surface is configured to substantially impart a received amount offload from a nozzle over to a mold.

25. The molding machine of claim 19, wherein:
the load-receiving surface is configured to abut a nozzle; and
the load-imparting surface is configured to abut a mold.

26. The molding machine of claim 19, further comprising:
a cooling device is configured to be located within the load-transferring body, the cooling device is configured to cool structural gaps located in gaps between the MAS feed body and structural components surrounding the MAS feed body.

27. The molding machine of claim 19, wherein:
the feed body is a metallic alloy slurry (MAS) feed body; and
the molding machine is a thixo-molding machine.

* * * * *